United States Patent [19]
Henson

[11] Patent Number: 5,974,324
[45] Date of Patent: Oct. 26, 1999

[54] ADAPTIVE FREQUENCY REUSE PLAN

[75] Inventor: Steven Ray Henson, Plano, Tex.

[73] Assignee: Ericsson Inc., Research Triangle Park, N.C.

[21] Appl. No.: 08/797,404

[22] Filed: Feb. 10, 1997

[51] Int. Cl.$^6$ .................................................. H04Q 7/36
[52] U.S. Cl. ............................................ 455/447; 455/452
[58] Field of Search .................................. 455/446, 447, 455/450, 452, 453, 524, 62, 63

[56] References Cited

U.S. PATENT DOCUMENTS

| | | | |
|---|---|---|---|
| 4,144,411 | 3/1979 | Frenkiel | 455/447 |
| 5,355,367 | 10/1994 | Comroe et al. | 455/447 |
| 5,428,815 | 6/1995 | Grube | 455/447 |
| 5,559,866 | 9/1996 | O'Neill | 455/447 |
| 5,722,043 | 2/1998 | Rappaport et al. | 455/447 |
| 5,734,983 | 3/1998 | Faruque | 455/446 |
| 5,850,608 | 12/1998 | Faruque | 455/446 |

FOREIGN PATENT DOCUMENTS

| | | |
|---|---|---|
| 0536864 | 4/1993 | European Pat. Off. . |
| 0616481 | 9/1994 | European Pat. Off. . |
| WO 9502308 | 1/1995 | European Pat. Off. . |
| 0684744 | 11/1995 | European Pat. Off. . |
| WO 9418804 | 8/1994 | WIPO . |
| WO 9507013 | 3/1995 | WIPO . |

OTHER PUBLICATIONS

PCT International Search Report, Mailed Oct. 28, 1998, PCT/US 98/02555.

*Primary Examiner*—Edward F. Urban
*Attorney, Agent, or Firm*—Jenkens & Gilchrist, P.C.

[57] ABSTRACT

A cell pattern for use with a frequency reuse plan is disclosed. Seven clusters each comprising N cells per cluster are grouped together as a modified cluster. Each cell is further divided into three sectors. The total number of available frequency channels are divided into a F times seven (F*7) number of groups. Frequency channels associated with a group are then assigned to each of the cells within the modified cluster. In order to increase call capacity within a particular sector, a frequency channel previously assigned to a corresponding sector within the same cell group is reused. Within a continuing increase in channel re-usage within a particular modified cluster, the (N*7)/(F*7) reuse plan is gradually lowered to the original N/F reuse plan without re-configuring the frequency allocation throughout the network.

23 Claims, 7 Drawing Sheets

FIG. 5

| | | | | | | | |
|---|---|---|---|---|---|---|---|
| $A1_1$ | $B1_1$ | $C1_1$ | $D1_1$ | $E1_1$ | $F1_1$ | $G1_1$ | ← 100 |
| 2 | 3 | 4 | 5 | 6 | 7 | 8 | |
| $A1_2$ | $B1_2$ | $C1_2$ | $D1_2$ | $E1_2$ | $F1_2$ | $G1_2$ | ← 110 |
| 9 | 10 | 11 | 12 | 13 | 14 | 15 | |
| $A1_3$ | $B1_3$ | $C1_3$ | $D1_3$ | $E1_3$ | $F1_3$ | $G1_3$ | |
| 16 | 17 | 18 | 19 | 20 | 21 | 22 | |
| $A2_1$ | $B2_1$ | $C2_1$ | $D2_1$ | $E2_1$ | $F2_1$ | $G2_1$ | ← 120 |
| 23 | 24 | 25 | 26 | 27 | 28 | 29 | |
| $A2_2$ | $B2_2$ | $C2_2$ | $D2_2$ | $E2_2$ | $F2_2$ | $G2_2$ | |
| 30 | 31 | 32 | 33 | 34 | 35 | 36 | |

⋮

| | | | | | | | |
|---|---|---|---|---|---|---|---|
| $A7_3$ | $B7_3$ | $C7_3$ | $D7_3$ | $E7_3$ | $F7_3$ | $G7_3$ | |
| 142 | 143 | 144 | 145 | 146 | 147 | 148 | ← 130 |
| $A1_1$ | $B1_1$ | $C1_1$ | $D1_1$ | $E1_1$ | $F1_1$ | $G1_1$ | ← 140 |
| 149 | 150 | 151 | 152 | 153 | 154 | 155 | |

⋮

ADAPTIVE FREQUENCY REUSE PLAN

BACKGROUND OF THE INVENTION

1. Technical Field of the Invention

The present invention relates to a cellular telecommunications network and, in particular, to a cell pattern within such a network using an adaptive frequency reuse plan.

2. Description of Related Art

Frequency reuse patterns are cell-based schemes for assigning the frequency channels available within a particular cellular telecommunications system. The most basic unit of any frequency reuse pattern is a cell. Each cell within a frequency reuse pattern is assigned a number of frequency channels. A plurality of cells are then associated together and referred to as a cluster and utilizes all of the frequency channels available to a particular cellular telecommunications system. Groups of clusters are then used to provide a cellular coverage area within the cellular telecommunications system and the frequency channels allocated for one cluster are reused in other clusters. The scheme for recycling or reassigning the frequency channels throughout the serving coverage area is referred to as a reuse plan. The distance between a first cell using a particular frequency channel within a first cluster and a second cell using the same frequency channel within a second cluster is further known as a reuse distance.

The reuse of the same frequency channels by a number of different cells implies that cells may suffer from co-channel interferences. It is therefore desirable for the received strength of the serving carrier (C) within each cell to be higher than the total co-channel interference level (I). As a result, the higher the carrier to interference (C/I) value, the better the speech quality. A higher C/I value is obtained partly by controlling the channel reuse distance. The larger the reuse distance between adjacent cells utilizing the same frequency channels, the lesser the co-channel interferences created between those cells.

The C/I ratio is further related to a frequency reuse plan (N/F) where N indicates the number of cells included within a single cluster and F indicates the number of frequency groups. For example, the C/I ratio is directly related to the following equation:

$$D_R = (3*F)^{1/2} * R$$

Where:

$D_R$ is the reuse distance;

F is the number of frequency groups;

R is the radius of a cell.

Accordingly, the larger the F value, the greater the reuse distance. However, it is not always desirable to use a larger F value to increase the C/I ratio. Since the total number of available frequency channels (T) is fixed within a particular mobile network, if there are F groups, then each group will contain T/F channels. As a result, a higher number of frequency group (F) would result in a fewer channels per cell and lesser call capacity.

For most cellular systems, capacity is not a major issue when the system initially goes into operation. Therefore, in order to achieve a high C/I value and to improve the quality of speech connection, a high frequency reuse plan (N/F), such as 9/27, is initially used. However, as the capacity increases, the cellular telecommunications network has to resort to a lower frequency reuse plan, such as a 7/21 or 4/12, to allocate more frequency channels per cell. Consequently, the whole cellular telecommunications network and its associated clusters and cells need to be reconfigured with a new frequency reuse plan. Such reconfiguration and reallocation requires an investment of considerable time and resource. On the other hand, due to poorer speech connection quality, it is undesirable to use a low frequency reuse plan from the beginning when there is no need for high capacity.

Accordingly, there is a need for a mechanism to enable service operators to adapt their frequency plan according to their capacity and C/I without re-configuring the channel allocation.

SUMMARY OF THE INVENTION

The present invention overcomes the foregoing and other problems with a modified cell cluster and an adaptive frequency reuse plan. The plan supports a gradual change from a high reuse plan to a low reuse plan to adapt to an increase in call capacity without requiring a re-configuration of the channel allocation throughout the network.

A cluster comprises N cells within a serving cellular telecommunications network. C number of contiguous clusters are then grouped together as a modified cluster. Each cell within the modified cluster is further partitioned into S number of sectors. The N cells within each cluster are alphabetically labeled in the same order. The cells associated with one cluster are then distinguished from the cells associated with another cluster by further adding a numerical script one through C to each cluster and its associated cells, respectively. S sectors within each cell are then further identified with a numerical subscript label from one to S.

A T number of available frequency channels are then divided into a F number of channel groups. Each channel group is then subdivided into a C times S number of sub-frequency groups. Each sector within a modified-cluster is then assigned frequency channels associated with a sub-frequency group. The available frequency channels are then reused within each of the modified clusters.

In order to increase call capacity within a first sector associated with a first cell for a first cluster, a frequency channel assigned to a second sector belonging to a second cell within the same cell group with the same subscript label is reused.

As another embodiment, frequency channels from other sectors are not reused within the first sector until all of the assigned frequency channels associated with the second sector have been reused by the first sector.

BRIEF DESCRIPTION OF THE DRAWINGS

A more complete understanding of the method and apparatus of the present invention may be had by reference to the following detailed description when taken in conjunction with the accompanying drawings wherein:

FIG. 5 illustrates the assignment of frequency channels to each sector within each cell of FIGS. 2 and 4;

DETAILED DESCRIPTION OF THE DRAWINGS

Figure 1:
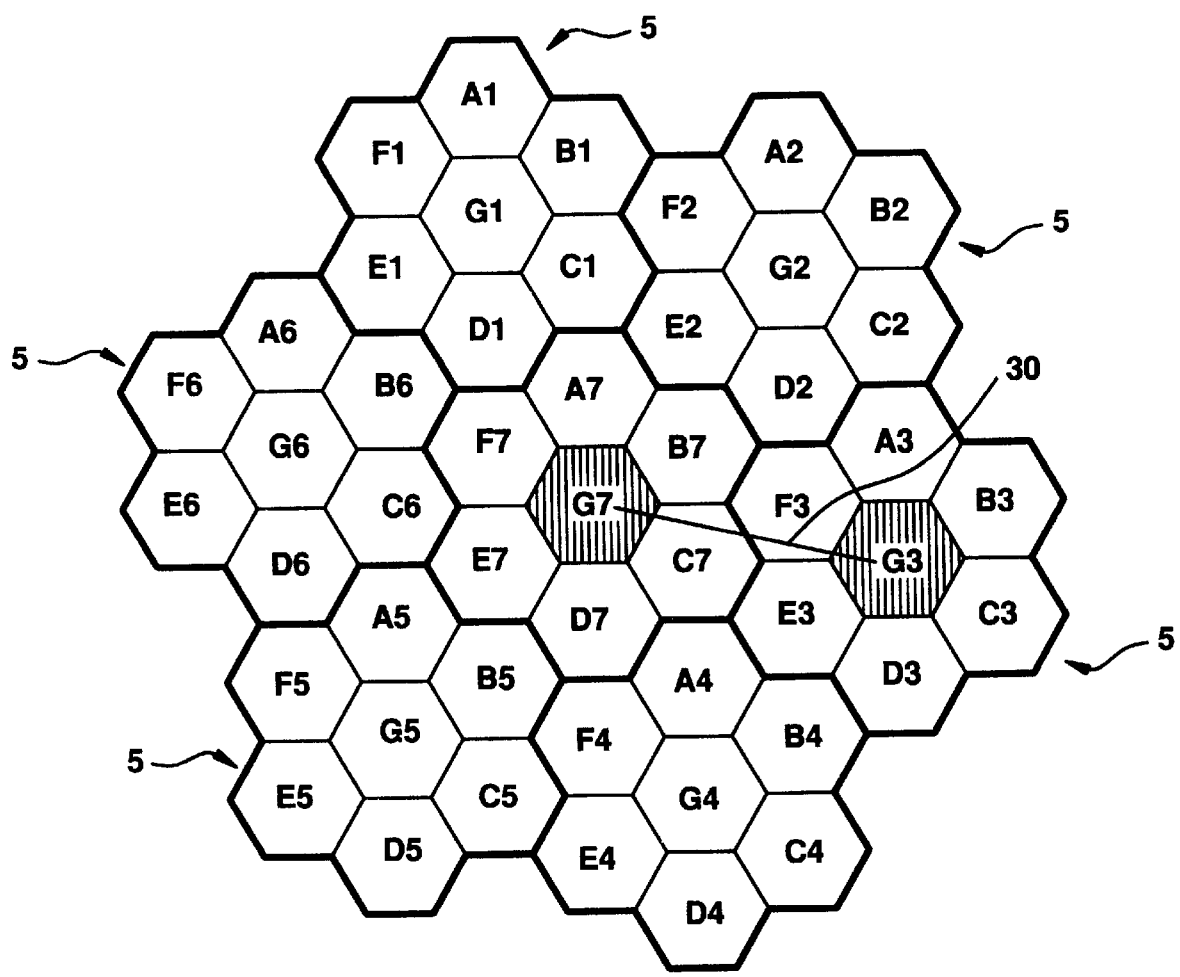
FIG. 1 is a diagram of a seven cell per cluster pattern using an omni-directional antenna to provide radio coverage over a particular area.

Reference is now made to FIG. 1 illustrating a pattern with seven (7) cells per cluster 5. An omni-directional antenna is used in each cell to provide radio coverage over a particular area. The pattern is schematically represented by a hexagonal grid with a single cell in the middle and six (6) surrounding additional cells. This pattern and the frequency assignment scheme associated therewith, which will be more fully discussed later, provide all of the basic properties of a conventional reuse pattern.

The proposed N=7 frequency plan for an omni-directional antenna site as shown in FIG. 1 is based on dividing all of the available frequency channels (T) in the spectral band available to a particular cellular telecommunications network into seven or multiples of seven frequency groups with approximately T/7 channels per frequency group. Table 1 shows the channel assignments for such an omni-directional antenna system.

TABLE 1

| | Frequency Channel Group | | | | | |
|---|---|---|---|---|---|---|
| A | B | C | D | E | F | G |
| Channel 1 | 2 | 3 | 4 | 5 | 6 | 7 |
| Number 8 | 9 | 10 | 11 | 12 | 13 | 14 |
| 15 | 16 | 17 | 18 | 19 | 20 | 21 |

As can be seen from Table 1, the frequency channels are assigned sequentially to each frequency channel group. Therefore, the difference in frequency channel numbers between frequency channels assigned to any channel group is seven. A frequency channel group is then associated with each cell in a manner that eliminates adjacent frequency channels within the cluster and with respect to adjacent clusters. These same frequencies, after being assigned to a first cluster, may then be reused by other clusters according to the same assignment configuration in order to provide cellular coverage over a specific area.

The seven cells within each cluster are typically alphabetically labeled. For example, a G-cell is in the middle surrounded by six A–F cells. Cells with the same label are then associated as a cell group. Each frequency channel group described above is then allocated to each corresponding cell within a cluster.

As an illustration, all frequency channels associated with the A frequency group are allocated to the A cells A1–A7. Similarly, frequency channels associated with the rest of the frequency groups B, C, D, E, F, and G, are allocated to the remaining cells B1–B7, C1–C7, D1–D7, E1–E7, F1–F7, and G1–G7, respectively. The same frequency channels are utilized by corresponding cells in each cluster 5 creating a potential for co-channel interference. For example, the G7 and G3 cells reuse the same frequencies. The distance between two cells utilizing the same frequency channels is known as a reuse distance 30. The greater the reuse distance, the lesser the chance of co-channel interference. However, in order to allocate more frequency channels per cell to increase call capacity, the number of frequency groups is decreased resulting in a lesser reuse distance. By reducing the reuse distance 30, a potentially higher co-channel interference arises. As a result, with an increase in call capacity, a decrease in speech connection quality may follow.

Figure 2:
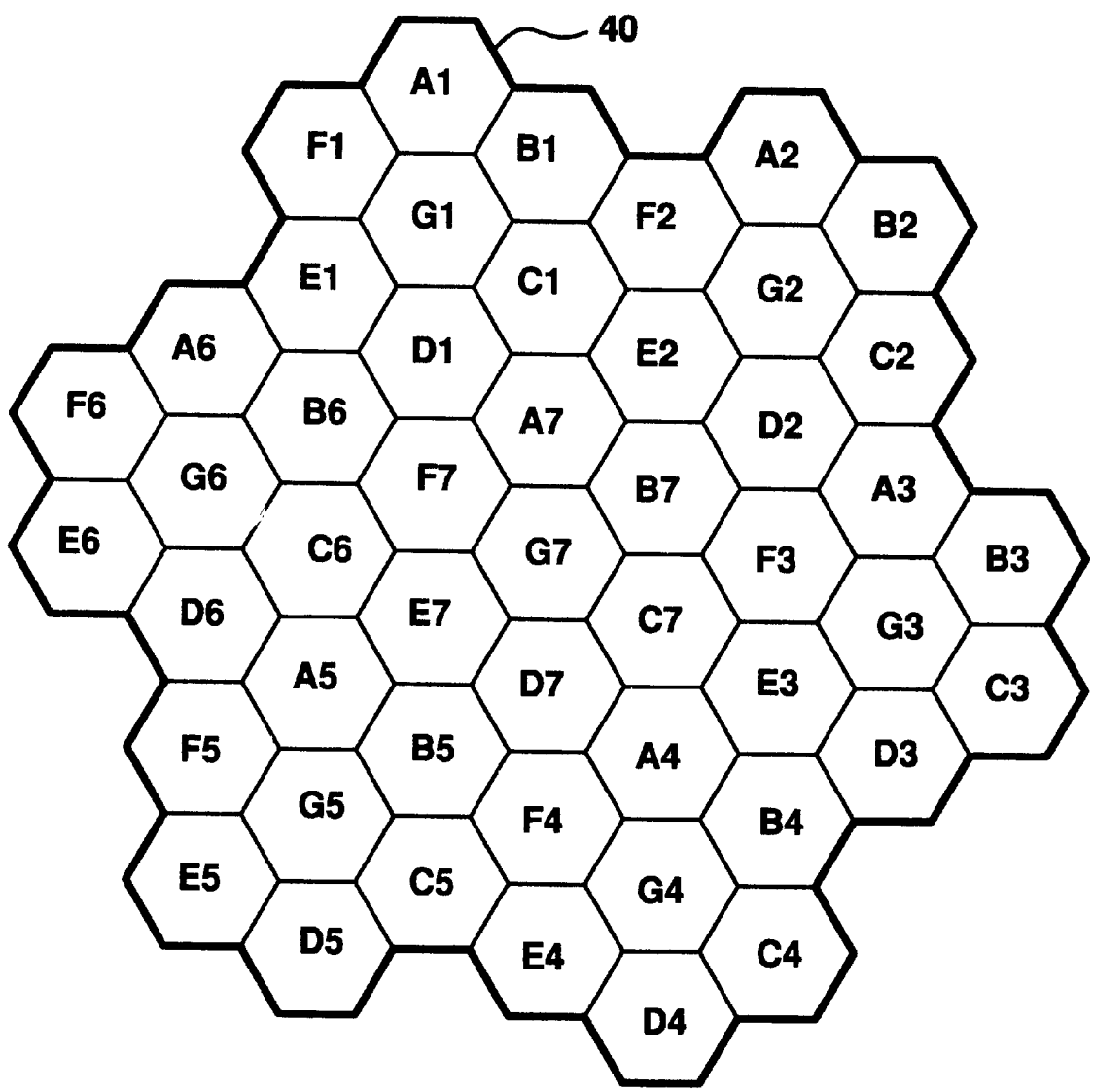
FIG. 2 is a diagram of a modified forty-nine cells per cluster pattern using uni-directional antennas in accordance with the teachings of the present invention.

Reference is now made to FIG. 2 illustrating a modified forty-nine cells per cluster pattern using uni-directional antennas in accordance with the teachings of the present invention. An initial determination is made as to which frequency reuse (N/F) plan is ultimately going to be used in the system for maximum capacity. Hereinafter, this is referred to as the "target" reuse plan. For example, the 7/21 plan as illustrated in FIG. 1 is determined. Thereafter, seven contiguous clusters are associated together as a modified cluster 40 creating a modified (N*7)/(F*7) plan. Accordingly, the modified cluster 40 includes seven times N (forty-nine for FIG. 2) number of cells associated within seven clusters. The number of frequency groups is further increased to F*7. As disclosed above, an increase in the number of frequency groups (F) increases the reuse distance (DR) The (N*7)/(F*7) plan then takes the allotted frequencies available to the serving cellular telecommunications network and distributes them over (N*7) cell sites. As an illustration of such a distribution:

TABLE 2

| | Cell Numbers | | | | | | | | |
|---|---|---|---|---|---|---|---|---|---|
| | A1 | B1 | C1 | D1 | E1 | F1 | G1 | A2 | B2...G7 |
| Channel | 1 | 2 | 3 | 4 | 5 | 6 | 7 | 8 | 9...49 |
| Number | 50 | 51 | 52 | 53 | 54 | 55 | 56 | 57 | 58...98 |
| | 99 | 100 | 101 | 102 | 103 | 104 | 105 | 106 | 107...147 |

Figure 3:
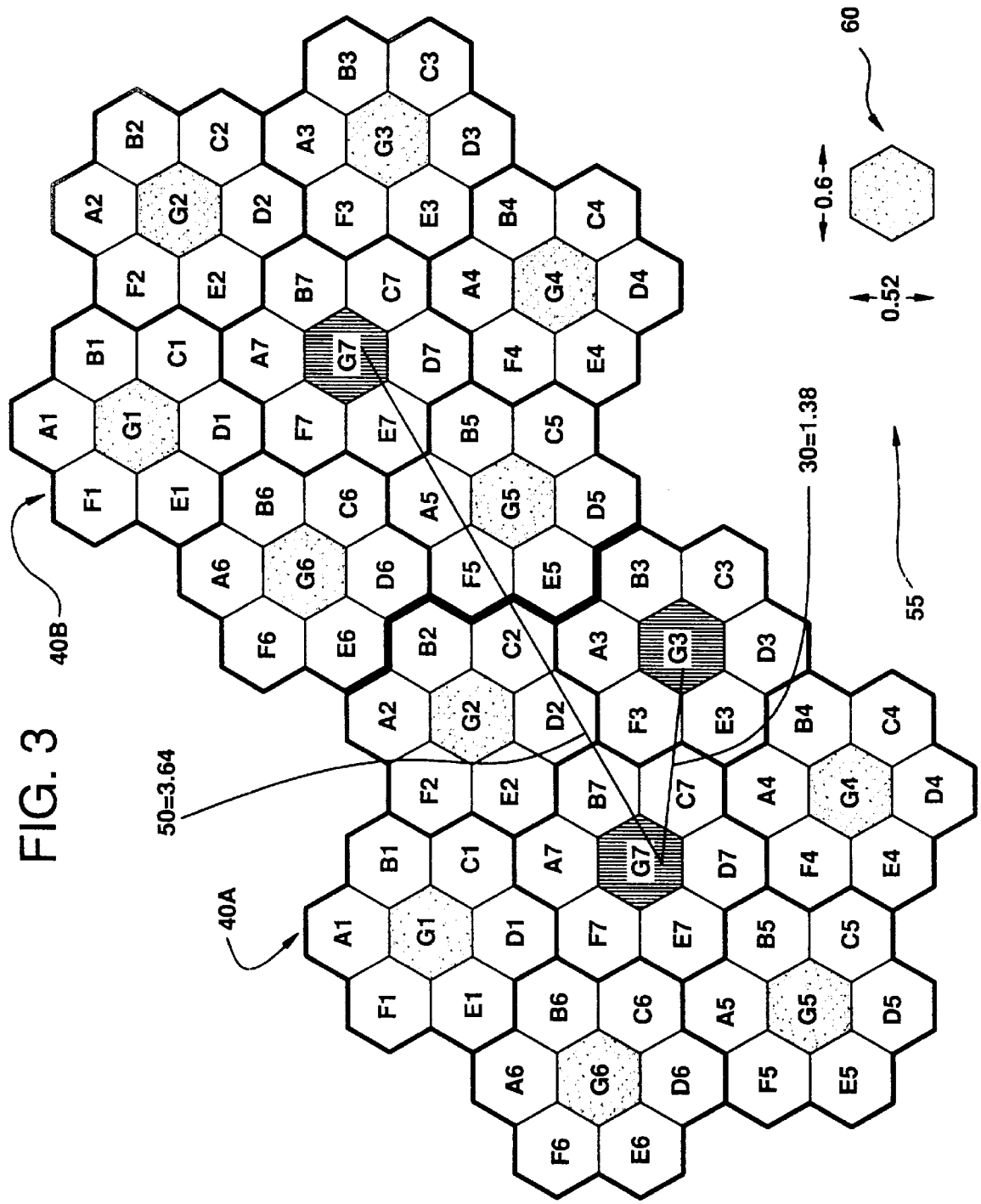
FIG. 3 is a diagram of a cell plan illustrating different reuse distances.

Reference is now made to FIG. 3 illustrating a reuse distance between two modified clusters 40 within the modified forty-nine cells per cluster pattern. Assuming that the width of each cell is 0.60 measurement units and the height is 0.52 measurement units, the reuse distance 30 between the two cells G7 and G3 using the same frequency group within a conventional frequency reuse plan (e.g., 7/21) as shown in FIG. 2 is 1.38 measurement units. On the other hand, a reuse distance 50 between two cells G7 using the same frequency group within the modified reuse plan (e.g., 49/147) is 3.64 measurement units. As a result, the use of a cluster and its six surrounding clusters to distribute the T number of frequency channels, rather than distributing the channels all within one cluster, creates an improvement of up to 2.6 times in the reuse distance.

Figure 4:
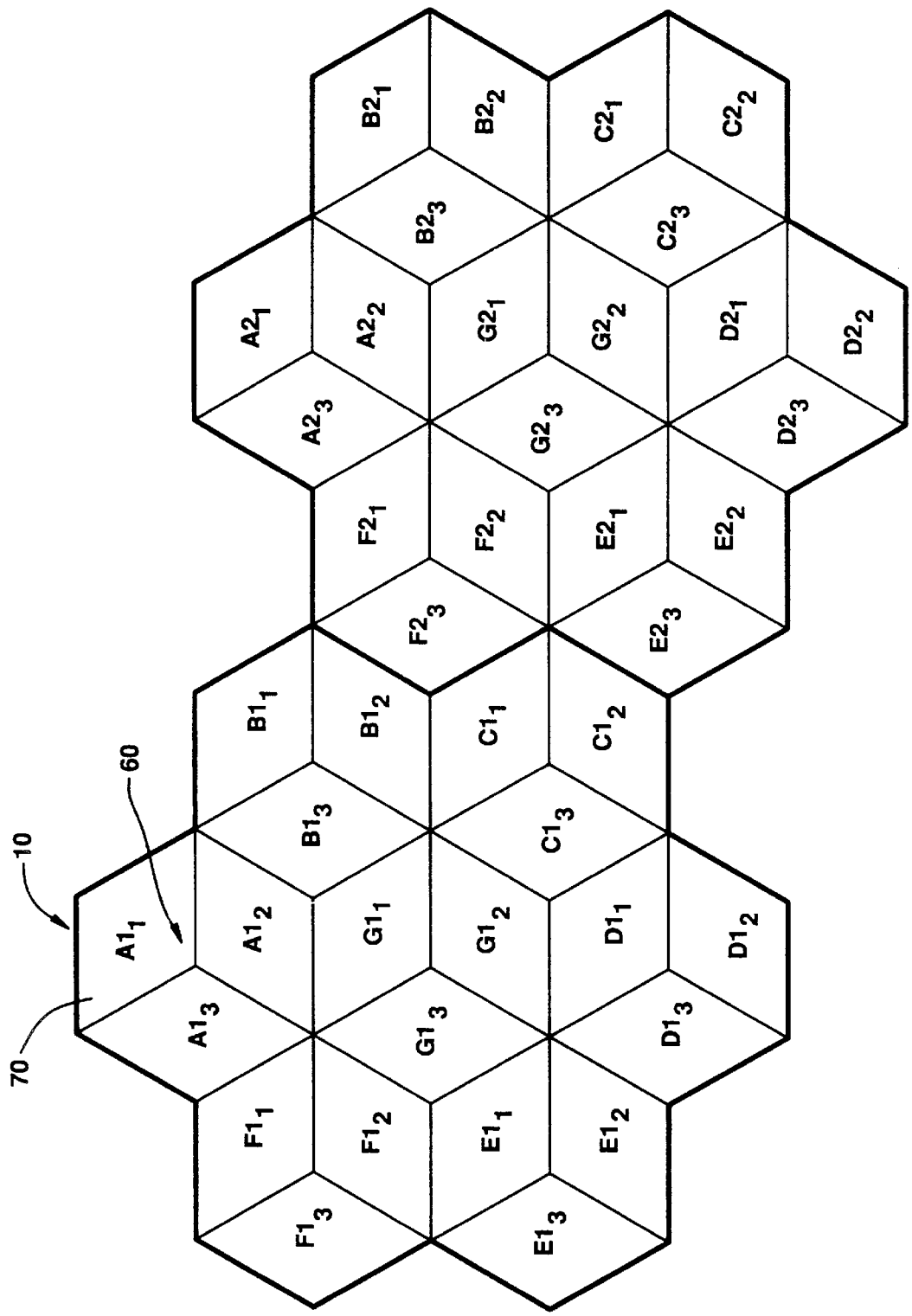
FIG. 4 is an illustration of a center-excited sectorized antenna configuration within an seven cells per cluster pattern.

FIG. 4 is an illustration of a center-excited sectorized antenna configuration within a seven-cell cluster. Each site contains a single antenna site 60 with three sectors 70 having antenna pointing azimuth separated by 120°. It should be understood that while FIG. 4 is described with respect to a three sector configuration, other multi-sector configurations may be used. Each sector 70 is approximated by the shape of a rhombi. Each sector can use, for example, a 60°, 90°, or 120° transmit antenna and two corresponding diversity receiver antennas with the same pointing azimuth. The center-excited three sector pattern splits the hexagon representing a cell into three rhombi. The frequency group assigned to that cell is accordingly split into three subgroups.

For identification purposes, the seven clusters within a modified cluster are numbered one through seven (1–7). Each cell associated with a particular cluster is then further identified by its alphabetical label plus the numerical label assigned to the parent cluster. The three sectors within a cell are further identified by retaining the label from its parent and further adding a sector subscript (e.g., 1–3). As an illustration, the cell A1 is sectored into three sectors labeled $A1_1$, $A1_2$, and $A1_3$. Similarly, the A2 cell within the next cluster is sectored into $A2_1$, $A2_2$, and $A2_3$. The available frequency channels are then assigned on a one-by-one basis starting with $A1_1$ where all sectors with the same subscript are sequentially assigned a frequency channel before assigning the next subscript sector. When all of the sectors within a first cluster are each assigned a frequency channel, the sectors within the rest of the clusters are assigned in a similar manner. This sectorization and labeling may be applied to the pattern illustrated in FIG. 2.

FIG. 5 illustrates the frequency channel allocation for the modified 49/147 plan (of FIGS. 2 and 4) in accordance with the teachings of the present invention. As illustrated by row 100, $A1_1$ is assigned first frequency channel number two (2). A sector from each of the cells within the same cluster with the same subscript (1) label is then sequentially numbered as shown. After all of the sectors with the first subscript label have been assigned a frequency channel, sectors with the second subscript label are then similarly assigned a frequency channel as shown in row 110. As a result, the difference between assigned channel numbers for two sectors within the same cell is in the magnitude of seven (7). For example, $A1_1$ is assigned channel number two (2) and $A1_2$ within the same cell is assigned channel number nine (9). When all of the sectors within the first cluster are assigned a frequency channel, the sectors within a second cluster are similarly assigned a frequency channel as shown in row 120. Accordingly, the difference between assigned channel numbers for two sectors within the same cell group with the same subscript label is in the magnitude of twenty-one (21). For example, $A1_1$ for the first cluster is assigned channel number two (2), and $A2_1$ with the same subscript for the A cell group associated with the second cluster is assigned channel number twenty-three (23).

When all sectors associated with seven clusters within a modified cluster are assigned a frequency channel, the remaining frequency channels are re-assigned repeatedly for the same sectors in a similar manner. There are one hundred forty seven (7*7*3) sectors within each modified cluster. Therefore, the last sector $G7_3$ is assigned channel number one-hundred-forty-eight (148). Assignment of remaining channels starts over again at sector $A1_1$ with channel number one-hundred-forty-nine (149) as illustrated in column 140. This process continuous until all T available channels have been assigned. As a result, the difference between multiple channel numbers assigned to the same sector is in the magnitude of one-hundred-forty-seven (147). As described above, there are forty-nine (49) cells within a modified cluster. Accordingly, the 49/147 plan is introduced.

Figure 6:
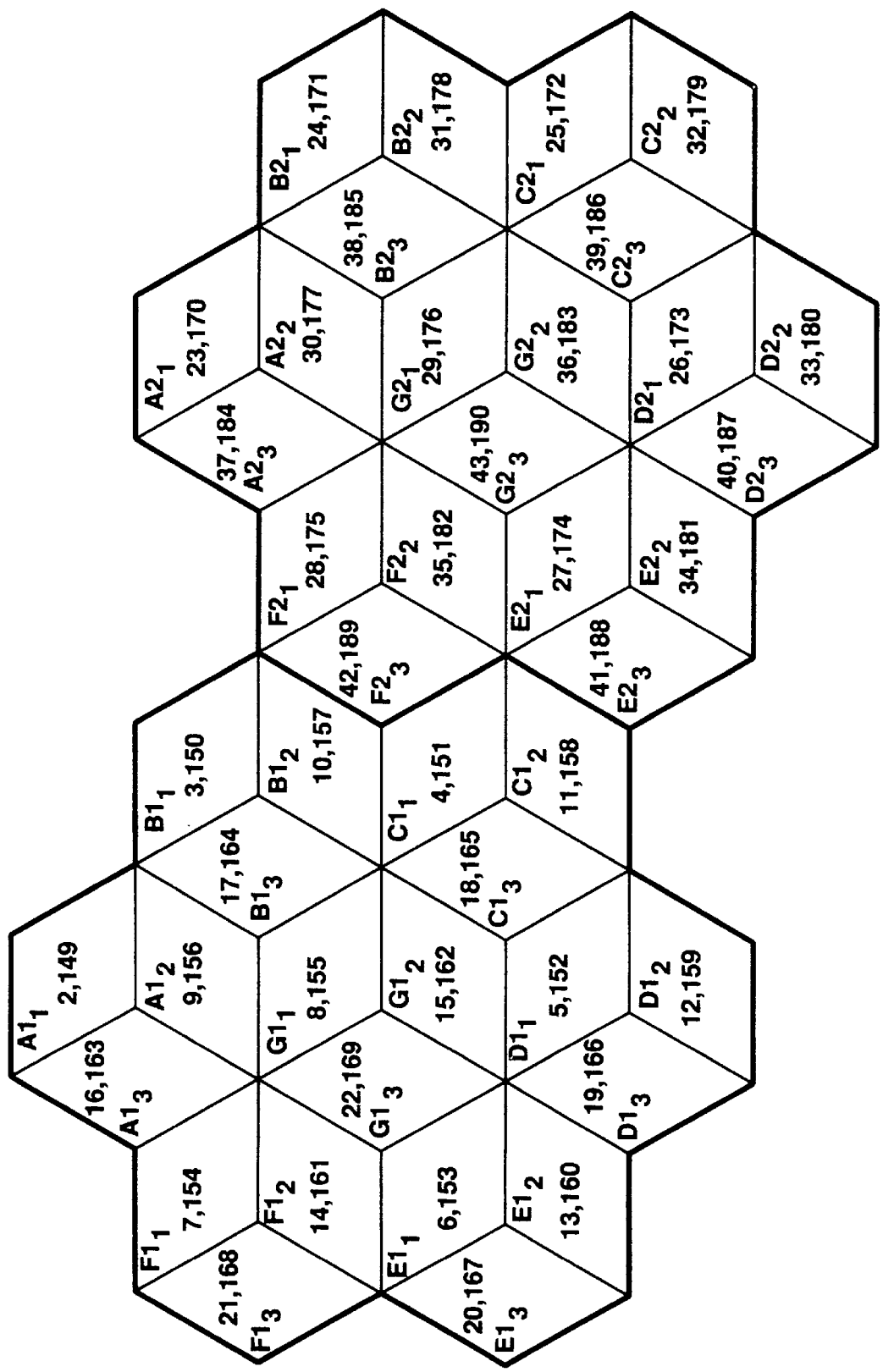
FIG. 6 is a diagram of a 49/147 cell plan of the present invention illustrating the assignment of frequency channels to each sector within each cell.

FIG. 6 is a diagram of the 49/147 cell plan (of FIGS. 2, 4, and 5) illustrating the assignment of frequency channels to each sector within each cell. As fully described in FIG. 5, the difference between assigned channel numbers to a particular sector is in the magnitude of one-hundred-forty-seven (147). Accordingly, since no same frequency channel is reused within the seven clusters, the reuse distance with the neighboring modified cluster is much greater. As a result, a higher C/I ratio and improved speech quality is introduced.

In response to an increase in demand for capacity at a particular sector (i.e., $A1_1$), the prior art teaches reallocating all of the frequency channels using a lower reuse plan. In accordance with the teachings of the present invention, however, a frequency channel from a different sector within the same cell group having the same subscript label is advantageously reused within that particular sector. As an illustration, in case sector $A1_1$ needs to be assigned more frequency channels for additional call capacity, a frequency channel previously assigned to sector $A2_1$ (belonging to the same cell group A and having the same subscript label one) is reused within sector $A1_1$. Similarly, $A1_1$ may reuse frequency channels previously assigned to $A3_1$, $A4_1$, $A5_1$, $A6_1$, and $A7_1$. Since, sector $A1_1$ was initially assigned frequency channels numbers two (2) and one-hundred-forty-nine (149), reusing frequency channels twenty-three (23) and one-hundred-seventy (170), for example from sector $A2_1$, decreases the difference in channels numbers to the magnitude of twenty-one (21). Accordingly, as far as those two sectors are concerned, they are using the 7/21 reuse plan as in FIG. 1.

Since reusing other frequency channels is only required for a particular sector with a need for additional capacity, as frequency channels are reused by neighboring sectors within the same modified cluster, the overall frequency reuse layout can be different throughout the system and can continually be updated without affecting the frequency assignment already in place.

As the system grows, additional capacity issues can be addressed by only drawing from one sector until all frequencies from that sector have been reused. Upon utilizing all of the frequencies within a particular sector, frequency channels previously assigned to a next sector within the same cell group having the same subscript label can be reused. For example, in order to address an increase in the call capacity for sector $A1_1$, frequency channels previously assigned to sector $A2_1$ are reused. Upon exhausting all frequency channels associated with that sector, other frequency channels from sector $A3_1$, for example, are reused for sector $A1_1$.

As the same frequency channels within the same modified cluster are being used within more than one cluster, a corresponding reuse distance decreases causing the C/I to also decrease.

Figure 7:
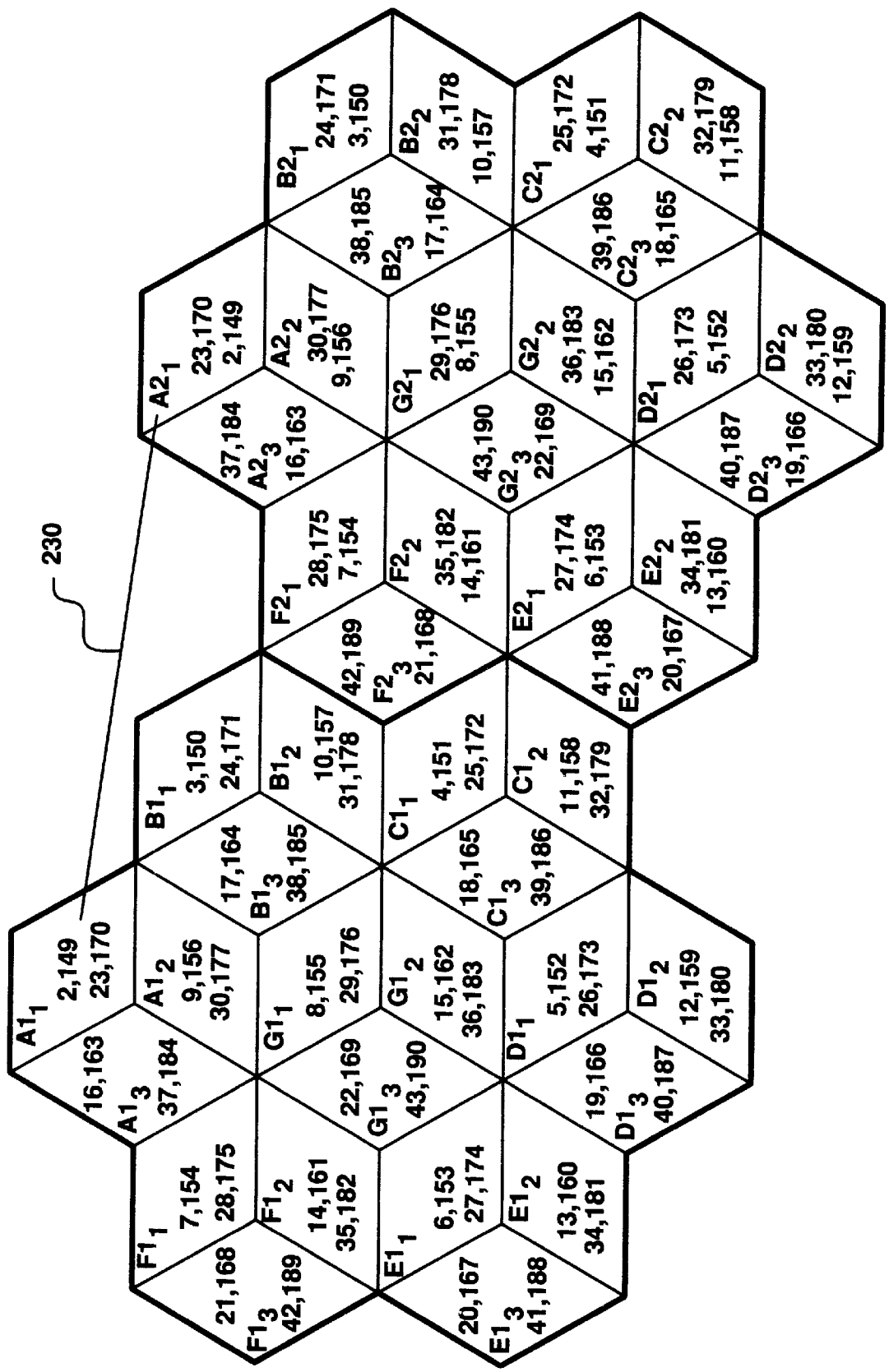
FIG. 7 is a diagram of a 49/147 plan adapted to a 7/21 cell plan in accordance with the teachings of the present invention.

Reference is now made to FIG. 7 illustrating a 49/147 plan adapted to a 7/21 plan. As sectors utilize all of the frequency channels assigned to other sectors within the same cell group with the same subscript label, each cluster will be utilizing the same frequency channels transforming the modified 49/147 plan into the target 7/21 plan. As an illustration, in order to handle maximum capacity, sector $A1_1$ uses all frequency channels assigned to sector $A2_1$ as well as frequency channels from all other sectors within the same cell group with the same subscript label. The rest of the sectors similarly reuse frequency channels previously assigned to other sectors. Since, the frequency channels being used by the two sectors are the same within a particular modified cluster, the reuse distance is accordingly reduced and an increase in co-channel interference is effectuated. As a result, the overall reuse plan is ultimately changed into the originally targeted 7/21 reuse plan.

In accordance with the teachings of the present invention, a service operator can initially deploy a cellular system with an attractive high reuse plan and selectively decrease the reuse plan to the targeted reuse plan to accommodate an increase in call capacity throughout the network.

Even though the present invention has been described using the 7/21 target reuse plan with the 49/147 modified reuse plan, it is to be understood that the present invention is applicable for other reuse plans, including but not limited to, 3/9, and 4/12 with the modified plan being 21/63, and 28/84, respectively. Other reuse plans and modified plans will be apparent to those skilled in the art.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for assigning T number of frequency channels within a cellular telecommunications network having a plurality of cells, wherein N cells are arranged as a cluster, said method comprising the steps of:

associating C contiguous clusters together as a modified cluster, a plurality of said modified clusters covering a geographic area;

labeling said N cells within each of said C contiguous clusters according to a cell labeling order;

associating cells from two or more clusters having a same cell label as a cell group;

sequentially assigning said T number of frequency channels within each of said plurality of modified clusters; and reusing, in a first cell in a first cluster, a frequency channel assigned to a second cell within a second cluster, said second cell within the same cell group as said first cell in order to increase capacity within said first cell of said first cluster.

2. The method of claim 1 further comprising the steps of:

dividing each of said N cells into D sectors;

labeling said D sectors according to a sector labeling order; and reusing, in a first sector of said first cell in said first cluster, a frequency channel assigned to a second sector of said second cell within said second cluster with the same sector label as said first sector in order to increase capacity within said first sector of said first cell of said first cluster.

3. The method of claim 2 wherein said D number of sectors includes three (3) sectors within each cell.

4. The method of claim 2 wherein said step of assigning said T number of frequency channels further comprises the steps of:

(A) sequentially assigning a first portion of said T number of frequency channels to first sectors with a first sector label within each of said N number of cells associated with a first cluster within said modified cluster until each of said first sectors has been assigned a frequency channel from said first portion;

(B) sequentially assigning an additional portion of said T frequency channels to next sectors with a next sector label up to D sector labels within each of said N number of cells associated with said first cluster until each of said D sectors has been assigned a frequency channel from said additional portion; and (C) sequentially assigning a remaining portion of said T frequency channels by repeating steps (A)-(B) for a next cluster up to C contiguous clusters within said modified cluster until N*C*D sectors have been assigned a frequency channel from said remaining portion and further repeating steps (A)–(B) using said remaining portion until each of said T number of frequency channels is assigned.

5. The method of claim 1 wherein said step of reusing further comprises the steps of:

reusing, in said first cell, first additional frequency channels assigned to said second cell until all of said first additional frequency channels are reused; and reusing, in said first cell, second additional frequency channels assigned to a third cell of a third cluster, said third cell from the same cell group as said first cell.

6. The method of claim 1 wherein said C contiguous clusters includes seven (7) contiguous clusters within said modified cluster.

7. A mobile telecommunications network for providing radio coverage within a particular geographic area, comprising:

a plurality of cells, each cell comprising D sectors;

a plurality of clusters, each cluster comprising N cells;

a plurality of modified clusters, each modified cluster comprising C contiguous clusters; and a T number of frequency channels distributed over and reused within each of said plurality of modified clusters, wherein said T number of frequency channels are reused according to a reuse plan whereby a first frequency channel is reused within a first sector associated with a first cluster, said first frequency channel assigned to a second sector associated with a second cluster wherein the difference in channel numbers assigned to said first sector and said first frequency channel being reused from said second sector is at least D times C.

8. The mobile telecommunications network of claim 7 wherein each of said D sectors is initially assigned more than one frequency channel with channel numbers N*C*D apart.

9. The mobile telecommunications network of claim 8 wherein said C includes a numerical value of seven (7).

10. The mobile telecommunications network of claim 7 wherein said D includes a numerical value of three (3).

11. A cell structure for use with a frequency reuse pattern, comprising:

a plurality of cells, each cell comprising a plurality of sectors;

a plurality of clusters, each cluster comprising an N number of cells from said plurality of cells;

a plurality of modified clusters;

a T number of frequency channels wherein said T number of frequency channels are divided into F number of frequency groups and distributed over and reused within each of said plurality of modified clusters;

a plurality of sub-frequency groups formed from said F number of frequency groups, wherein each of said plurality of sectors is assigned frequency channels associated with one of said plurality of sub-frequency groups; and wherein in order to increase the capacity for a first sector within a first cluster, a frequency channel assigned to a second sector associated with a second cluster is reused within said plurality of modified clusters, the difference in channel numbers between said frequency channels already assigned to said first sector and said channel frequency being reused from said second sector is at least twenty-one.

12. The cell structure of claim 11, wherein in order to further increase the capacity for said first sector, a frequency channel from a third sector within a third cluster is reused in said first sector only after all frequency channels from said second sector have been reused by said first sector.

13. A method for adaptively changing a first reuse plan to a second reuse plan within a cellular telecommunications network, said method comprising the steps of:

associating N cells as a cluster;

associating a plurality of clusters as a modified cluster;

distributing T number of frequency channels within said modified cluster according to said first reuse plan by:
 assigning a first group of frequency channels to a first cell in a first cluster; and
 assigning a second group of frequency channels to a second cell in a second cluster, wherein said first group is different from said second group; and reusing, in order to accommodate an increase in call capacity within said first cell, frequency channels from said second group of frequency channels within said first cell to adaptively change to said second reuse plan.

14. The method of claim 13, wherein said step of reusing further includes reusing, within said first cell associated with a first cluster within said modified cluster, a first frequency channel assigned to said second cell associated with a second cluster within the same modified cluster wherein the difference in channel numbers between a second frequency channel assigned to said first cell and said first frequency channel reused from said second cell is at least seven.

15. The method of claim 13 further comprising the steps of:

partitioning each cell within said modified cluster into D number of sectors; and assigning said D number of sectors one or more of said T number of frequency channels according to said first reuse plan.

16. The method of claim 15 further comprising the step of reusing, within a first sector within said first cell of a first cluster within said modified cluster, a first frequency channel assigned to a second sector within said second cell of said second cluster within said modified cluster, wherein the difference in channel numbers between a second frequency channel assigned to said first sector and said first frequency channel being reused from said second sector is at least twenty-one.

17. The method of claim 16, wherein said step of reusing further includes the step of reusing a third frequency channel from a third sector within a third cluster only after all frequency channels from said second sector have been reused.

18. The method of claim 13 wherein said N includes a numerical value of seven (7).

19. A method for automatically adapting from a first reuse plan to a second reuse plan within a cellular telecommunications network having a plurality of cells divided into one or more sectors, said method comprising the steps of:

associating N cells in a predetermined sequence as a cluster;

associating M clusters as a modified cluster having M*N cells;

associating cells from each of said M clusters having a same respective sequence position as a cell group;

distributing T number of frequency channels within said modified cluster such that each of said T number of frequency channels is assigned to only one of said M*N cells in said modified cluster to establish said first reuse plan;

adapting from said first reuse plan to said second reuse plan by reusing said T number of frequency channels within said N cell groups to establish said second reuse plan.

20. The method of claim 19 wherein said step of adapting further comprises the steps of:

a) reusing, in a first cell of a corresponding cell group, one or more frequency channels assigned to a second cell in said corresponding cell group until all of said one or more frequency channels are reused; and b) reusing, in said first cell, a second one or more frequency channels assigned to one or more additional cells in said corresponding cell group not to exceed a maximum of M cells, until all of said second one or more frequency channels are reused.

21. The method of claim 20 wherein said step of adapting further comprises the steps of:

repeating steps a) and b) of claim 20 for each of said M corresponding cells in said N cell groups until said second reuse plan is established for said modified cluster such that said each of said M corresponding cells in said N cell groups is assigned an identical group of said T number of frequency channels.

22. The method of claim 19 wherein said step of adapting further comprises the steps of:

a) reusing, in a first sector of a first cell of a corresponding cell group, one or more frequency channels assigned to a second sector of a second cell in said corresponding cell group until all of said one or more frequency channels are reused; and b) reusing, in said first sector of said first cell, a second one or more frequency channels assigned to one or more additional sectors of additional cells in said corresponding cell group not to exceed a maximum of M cells, until all of said second one or more frequency channels are reused.

23. The method of claim 22 wherein each of said M cells in said N cell groups further includes a plurality of sectors and said step of adapting further comprises the steps of:

repeating steps a) and b) of claim 22 for each of said plurality of sectors of said M corresponding cells in said N cell groups until said second reuse plan is established for said modified cluster such that said each of said plurality of sectors in said M corresponding cells in said N cell groups is assigned an identical group of said T number of frequency channels.

* * * * *